United States Patent
Yamada et al.

(10) Patent No.: US 9,393,994 B2
(45) Date of Patent: Jul. 19, 2016

(54) CHARACTERISTIC CHANGE DETECTION DEVICE FOR STEERING TRANSMISSION SYSTEM

(75) Inventors: Yoshihisa Yamada, Nagoya (JP); Takeshi Kano, Nisshin (JP); Tatsushi Takasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 14/403,430

(22) PCT Filed: May 31, 2012

(86) PCT No.: PCT/JP2012/003606
§ 371 (c)(1),
(2), (4) Date: Nov. 24, 2014

(87) PCT Pub. No.: WO2013/179351
PCT Pub. Date: Dec. 5, 2013

(65) Prior Publication Data
US 2015/0120139 A1    Apr. 30, 2015

(51) Int. Cl.
*B62D 6/00*    (2006.01)
*B62D 5/04*    (2006.01)

(52) U.S. Cl.
CPC .............. *B62D 6/005* (2013.01); *B62D 5/0481* (2013.01)

(58) Field of Classification Search
CPC ................. B62D 5/0481; B62D 6/003; B60G 2400/0523; B60G 2400/41
USPC ........ 701/41, 42, 38, 51, 79, 81, 89; 180/410, 180/6.6, 337, 76, 421, 422, 443, 446; 303/173, 183
See application file for complete search history.

(56) References Cited

U.S. PATENT DOCUMENTS

| | | | |
|---|---|---|---|
| 6,931,313 B2* | 8/2005 | Kato | B60T 8/172 180/443 |
| 7,500,537 B2* | 3/2009 | Itoh | B62D 5/003 180/402 |
| 2008/0040001 A1* | 2/2008 | Ogawa | B62D 5/0487 701/41 |
| 2008/0149414 A1* | 6/2008 | Ogawa | B62D 5/008 180/446 |

FOREIGN PATENT DOCUMENTS

| | | |
|---|---|---|
| JP | A-2004-276734 | 10/2004 |
| JP | A-2004-330879 | 11/2004 |
| JP | 2005-053447 A | 3/2005 |
| JP | 2005-335632 A | 12/2005 |

\* cited by examiner

*Primary Examiner* — Dalena Tran
(74) *Attorney, Agent, or Firm* — Oliff PLC

(57) ABSTRACT

A steering torque sensor detects steering torque of a steering wheel. A steering angle sensor detects a steering angle of the steering wheel. An abnormality determining unit determines that a characteristic change is caused in the steering transmission system, when it is determined that the steering torque is smaller than or equal to a predetermined value and when the number of times when a difference between target vehicle behavior that is calculated from the steering angle and actual vehicle behavior is larger than or equal to a reference value is larger than or equal to a predetermined number of times during one steering.

2 Claims, 5 Drawing Sheets

CHARACTERISTIC CHANGE DETECTION DEVICE FOR STEERING TRANSMISSION SYSTEM

TECHNICAL FIELD

The present invention relates to a technique for detecting a characteristic change in a steering transmission system.

BACKGROUND ART

In vehicle behavior control techniques such as VSC (Vehicle Stability Control), various controls are performed by using a detected value of a steering angle sensor mounted on a steering wheel. When a steering angle sensor of a type that outputs a relative angle is used, the zero point (neutral position) of the steering angle sensor is first detected, and calculates a steering absolute angle based on the detected zero point (see, for example, Patent Document 1). Accordingly, it is important to accurately detect the steering angle zero point.

RELATED ART DOCUMENT

Patent Document

[Patent Document 1] Japanese Patent Application Publication No. 2004-276734

DISCLOSURE OF THE INVENTION

Problem to be Solved by the Invention

Various components in a steering transmission system, ranging from a steering wheel to a wheel, are mostly supported with an elastic member, such as a rubber bush, being interposed between each of the components and a vehicle body, for the purposes of: reducing vibration of a steering; adjusting a steering feeling; and securing compliance steer, etc. When a transmission characteristic is changed, like the case where a play is caused in a steering transmission system due to the aged deterioration of these elastic members, the linearity between a steering angle and a steering wheel turning angle is not maintained, and there occurs the problem that: a steering feeling may be changed; or accuracy in estimating a vehicle state amount based on steering angle information may be decreased.

The present invention has been made in view of these situations, and a purpose of the invention is to provide a technique for detecting a characteristic change in an elastic member in a steering transmission system while a vehicle is traveling.

Means for Solving the Problem

An aspect of the present invention is a characteristic change detection device for steering transmission system. This device includes: a steering torque sensor that detects steering torque of a steering wheel; a steering angle sensor that detects a steering angle of the steering wheel; and an abnormality determining unit that determines that a characteristic change is caused in the steering transmission system, when the steering torque is smaller than or equal to a predetermined value and when the number of times when a difference between target vehicle behavior that is calculated from the steering angle and actual vehicle behavior is larger than or equal to a reference value is larger than or equal to a predetermined number of times during a predetermined period of time.

According to this aspect, a characteristic change (e.g., occurrence of a play) in a steering transmission system, which may be caused due to aged deterioration of an elastic member, such as a rubber bush; can be detected by using a detected value of the steering torque sensor or the steering angle sensor included in an electric power steering device.

Advantage of the Invention

According to the present invention, a characteristic change in an elastic member in a steering transmission system can be detected while a vehicle is traveling.

BEST MODE FOR CARRYING OUT THE INVENTION

Figure 1:
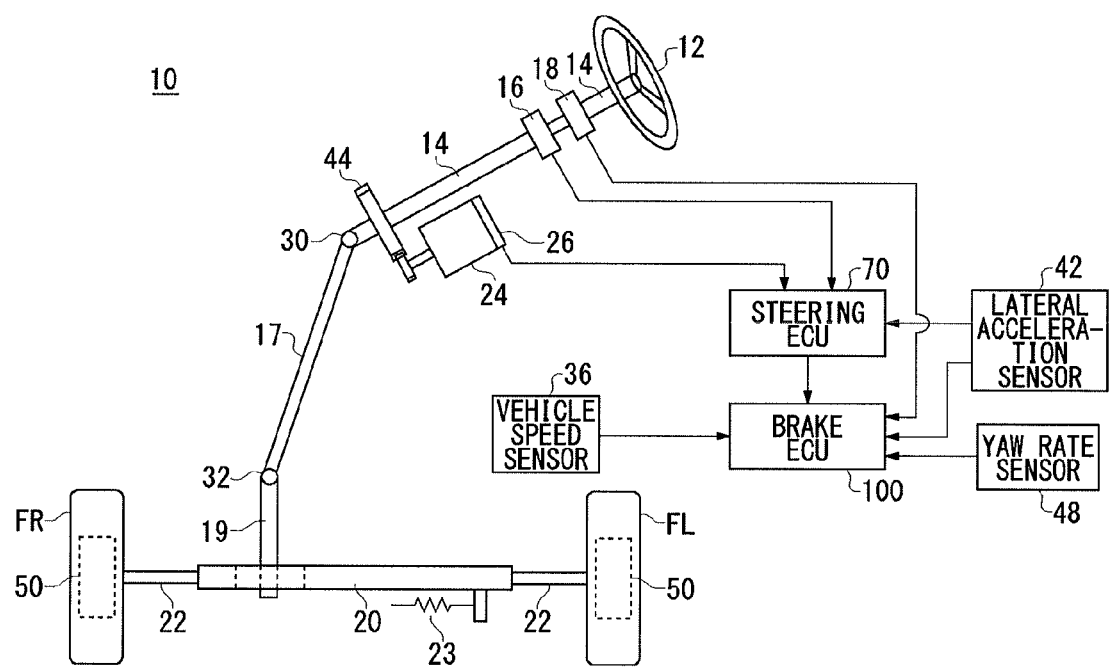
FIG. 1 is a view illustrating a schematic structure of a vehicle including a characteristic change detection device for steering transmission system according to one embodiment of the present invention.

FIG. 1 is a view illustrating a schematic structure of a vehicle 10 including a characteristic change detection device for steering transmission system according to one embodiment of the present invention. FIG. 1 is a schematic view of a front wheel portion of a four-wheeled vehicle. A traveling direction of the vehicle can be changed by steering the right front wheel FR and the left front wheel FL, which are turning wheels.

The vehicle 10 includes an electric power steering device (hereinafter, referred to as "EPS"). The EPS includes: a steering wheel 12 to be steered by a driver; a steering shaft 14 connected to the steering wheel; a deceleration mechanism 44 provided at the lower end of the steering shaft; and a steering assist motor 24 whose output shaft is connected to the deceleration mechanism 44. The steering assist motor 24 provides assist force for assisting a steering operation by rotationally driving the steering shaft 14.

On the steering shaft 14, a non-illustrated torsion bar, a steering torque sensor 16 for detecting torque generated in the torsion bar, and a steering angle sensor 18 for detecting a steering angle of the steering wheel 12 are installed. Outputs of these sensors are transmitted to a steering electronic control unit (ECU) 70 and a brake ECU 100.

The steering shaft 14 is connected to an intermediate shaft 17 and a pinion shaft 19 via universal joints 30 and 32. The pinion shaft 19 is connected to a rack and pinion mechanism 20 that extends in the vehicle lateral direction (vehicle width direction) and includes a rack bar 22 sliding in the shaft longitudinal direction. The intermediate shaft 17 includes, as part of it, a rubber coupling.

The rack and pinion mechanism 20 is formed by meshing a pinion tooth formed at one end of the pinion shaft 19 and a rack shaft. Additionally, the rack and pinion mechanism 20 is supported by the vehicle body via a steering gear mount bush 23.

When a driver operates the steering wheel 12, a rotation of the steering shaft 14 is transmitted to the rack and pinion mechanism 20 through the shafts 17 and 19, and then converted into a linear movement in the horizontal direction of the rack bar 22 by the rack and pinion mechanism 20. Each of tie rods (not illustrated) is coupled to each of both ends of the rack bar 22. The other ends of the tie rods are respectively connected to knuckle arms (not illustrated) for respectively supporting the right front wheel FR and the left front wheel FL. When the rack bar 22 moves linearly, the right front wheel FR and the left front wheel FL are turned.

A vehicle speed sensor 36 that detects the number of rotations of a wheel to output vehicle speed is attached near to the vehicle. Alternatively, vehicle speed may be determined based on the data from a non-illustrated GPS (Global Positioning System), instead of the vehicle speed sensor 36. A lateral acceleration sensor 42 that detects the acceleration in the lateral direction of a vehicle is also mounted on the vehicle body. Values detected by these sensors are transmitted to the brake ECU 100.

The steering ECU 70 calculates an assist value for the steering torque based on the detected value received from each sensor, and outputs a control signal in accordance with the assist value to the steering assist motor 24. Because a steering mechanism including the aforementioned EPS is well known, further detailed description thereof will be omitted in the present description.

As described above, when a characteristic change is caused, like the case where a play is caused in the steering transmission system due to the aged deterioration of an elastic member such as a rubber bush, the linearity between a steering angle and a steering wheel turning angle is not maintained, and there occurs the problem that: a steering feeling may be changed; or accuracy in estimating a vehicle state amount based on steering angle information may be decreased. More specifically, the brake ECU 100 determines whether VSC should be operated based on a steering angle. Accordingly, if a steering angle is not detected, a timing at which VSC is operated becomes unsuitable or a brake control amount by VSC becomes unsuitable.

So, in the present embodiment, a characteristic change in an elastic member in the steering transmission system is detected based on the information detected by the steering angle sensor and the steering torque sensor that are included in EPS.

Figure 2:
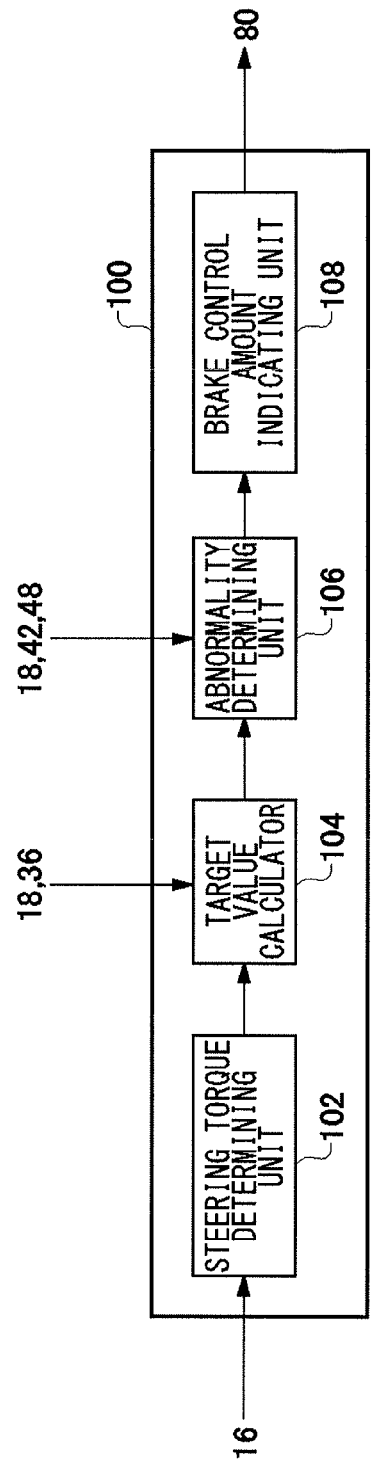
FIG. 2 is a functional block diagram illustrating a structure of a portion, of a brake ECU, which is involved with characteristic change detection for steering transmission system according to the present embodiment.

FIG. 2 is a functional block diagram illustrating a structure of a portion, of the brake ECU 100, which is involved with the characteristic change detection for steering transmission system according to the present embodiment. Each block illustrated herein can be implemented by an element including a CPU or memory of any computer or by an electrical circuit in terms of hardware, whereas implemented by a computer program, etc., in terms of software; however, it is illustrated herein as a functional block achieved by cooperation of them. Accordingly, it can be understood by those skilled in the art that these functional blocks may be implemented in a variety of forms by any combination of hardware and software.

A steering torque determining unit 102 receives a detected value MT of the steering torque sensor 16 to determine whether the steering torque is smaller than a predetermined value. This determination is performed to determine whether a vehicle is in an operation state in which steering force is so small that VSC is not operated, for example, in an operation state in which a vehicle can be steered by an extent of putting hands lightly on the steering wheel, and the predetermined value is, for example, 1.2 Nm.

For the following reason, abnormality determination for steering transmission system, which will be described below, is performed in a region where the steering torque is small. That is, when the steering torque is small, the axial force applied to the tie rod is very small, and hence the force applied to each portion of the steering transmission system, such as the rack and pinion mechanism 20, is also small. In this situation, a change in vehicle behavior is small and an influence on the abnormality determination, occurring due to the vehicle behavior, is small, and hence it can be considered that this situation is suitable for accurate abnormality determination.

A target value calculator 104 receives a detected value V of the vehicle speed sensor 36 and a detected value MA of the steering angle sensor 18, in order to calculate, from these values, either a target lateral acceleration (hereinafter, referred to as a "target Gy") or a target yaw rate (hereinafter, referred to as a "target YR"). The target Gy or the target YR is calculated by the following equations:

$$\text{Target } Gy = V^2 \cdot MA/N/WB$$

$$\text{Target } YR = V \cdot MA/N/WB$$

Wherein, N represents an overall steering ratio (steering angle/steering wheel turning angle), and WB represents a wheel base. These values are recorded in the target value calculator 104 in advance.

An abnormality determining unit 106 determines whether a vehicle state estimated from an steering angle of the steering wheel matches an actual vehicle state by comparing the target Gy or the target YR calculated by the target value calculator 104 with a detected value by the lateral acceleration sensor 42 (hereinafter, referred to as "measured Gy") or a detected value by the yaw rate sensor 48 (hereinafter, referred to as "measured YR"). This determination method will be described later with reference to FIG. 3. When both do not match each other, the abnormality determining unit 106 determines that a characteristic change is caused in the steering transmission system.

When it is determined by the abnormality determining unit 106 that a characteristic change is caused in the steering transmission system, a brake control amount indicating unit 108 gradually reduces a brake control amount in VSC, and finally stops the VSC control. More specifically, the brake control amount indicating unit 108 controls, in accordance with the VSC brake control amount, the oil pressure of a wheel cylinder installed in each wheel.

Alternatively, a structure may be adopted, in which: a driver is informed by using a speaker or a lamp, etc., that a characteristic change in the steering transmission system is detected, without changing the brake control amount in VSC; or VSC is simply prohibited from being performed.

Figure 3:
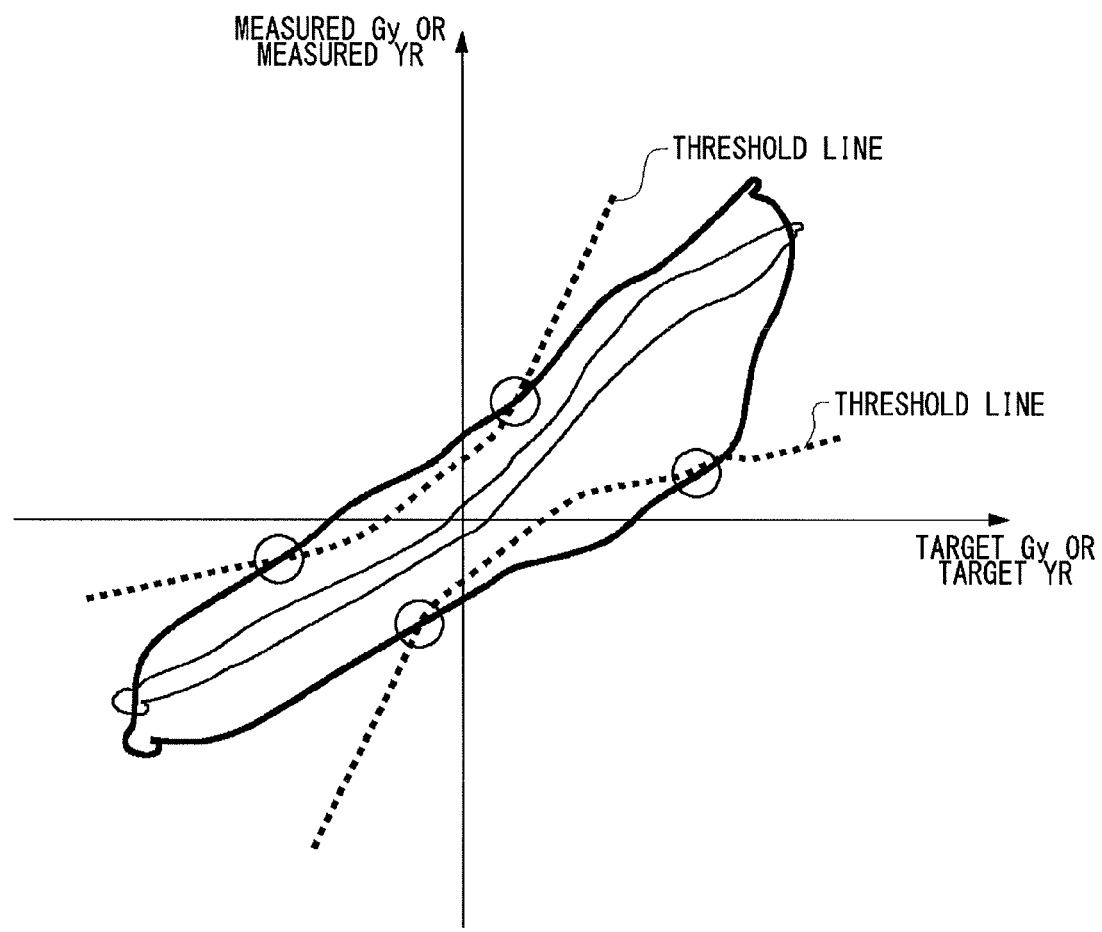
FIG. 3 is a view for explaining a method of determining whether a target vehicle state, which can be calculated from a steering angle of a steering wheel, matches an actual vehicle state.

FIG. 3 is a conceptual view for explaining a method of determining, by the abnormality determining unit 106, whether a vehicle state, which is estimated from a steering angle of the steering wheel, matches an actual vehicle state. The horizontal axis in the view represents a target Gy (or target YR) calculated from a steering angle of the steering wheel, while the vertical axis represents a measured Gy (or measured YR) detected by the lateral acceleration sensor 42 or the yaw rate sensor 48.

FIG. 3 illustrates the relationship between the target Gy (or target YR) and the measured Gy (or measured YR) during driving operations ranging from a state in which a vehicle travels straight to a state in which, after a steering wheel is turned and returned, the vehicle travels straight again (hereinafter, the aforementioned driving operations are referred to as "one steering"). It is desirable that the one steering is performed within a relatively short period of time (e.g., 30 seconds) during which an influence of a temperature drift on the lateral acceleration sensor or the yaw rate sensor can be disregarded.

Because the abnormality determination for steering transmission system is performed only when the steering torque MT is small, as described above, the aforementioned course of "straight traveling→steering→return→straight traveling" is limited to what is caused in a driving operation in which a steering angle is relatively small, like a lane changing.

The thin solid line in the graph shows the relationship between the target Gy (or target YR) and the measured Gy (or measured YR) in a normal vehicle, i.e., in a vehicle in which a characteristic change is not caused in the steering transmission system. In a normal vehicle, the aforementioned relationship becomes close to a proportional one, although the relationship does not become perfectly proportional due to existence of a hysteresis component resulting from a play or friction in a steering wheel. Accordingly, the graph in the view has an elongated annular shape extending from a lower-left direction to an upper-right direction. The section going toward the upper right from the original point and that going toward the lower left from the original point correspond to the turning of a steering wheel, while the section going toward the original point from the upper right and that going toward the original point from the lower left correspond to the return of the steering wheel. The positive and negative of each of the steering torque and the steering angle correspond to: one of a clockwise rotation from the neutral position and a counter-clockwise rotation therefrom; and the other of the two rotations, respectively.

The thick solid line in the graph shows the relationship between the target Gy (or target YR) and the measured Gy (or measured YR) in a vehicle in which a characteristic change is caused in the steering transmission system. It can be seen that the proportional relationship between the target Gy (or target YR) and the measured Gy (or measured YR) collapses and the graph has a large annular shape. It can be considered that: the reason why the proportional relationship thus collapses in a vehicle in which a characteristic change is caused in the steering transmission system is because it takes time for the steering wheel turning angle to follow a change in the steering angle, that is, because a play is caused in the steering transmission system or the stiffness of a component is decreased.

The abnormality determining unit 106 determines that a characteristic change is caused in the steering transmission system, when the number of times when the absolute value of a difference between the target Gy (or target YR) and the measured Gy (or measured YR) is larger than or equal to a reference value is larger than or equal to a predetermined number of times during the aforementioned one steering.

Alternatively, the abnormality determining unit 106 may determine that a characteristic change is caused in the steering transmission system, when the number of occurrences of the events, where the line showing the relationship between the target Gy (or target YR) and the measured Gy (or measured YR) exceeds the threshold lines represented by the dotted lines in FIG. 3 (the events are represented by the white circles in FIG. 3), is larger than or equal to a predetermined number of times (e.g., four times). These threshold lines are set in advance by experiments or simulations as the lines showing, when it is assumed, for example, that there is a discrepancy (e.g., ±15°) between the steering angle and the steering wheel turning angle, the relationship between the target Gy (or target YR) and the measured Gy (or measured YR).

The reason why the abnormality determining unit 106 performs the determination based on the count of the number of times when the threshold lines are exceeded, as described above, is because erroneous determination performed based on the detection of a singly-occurring event is avoided since the measured Gy (or measured target YR) may deviate from the target Gy (or measured target YR) due, for example, to an abrupt change in road surface states, etc.

Figure 4:
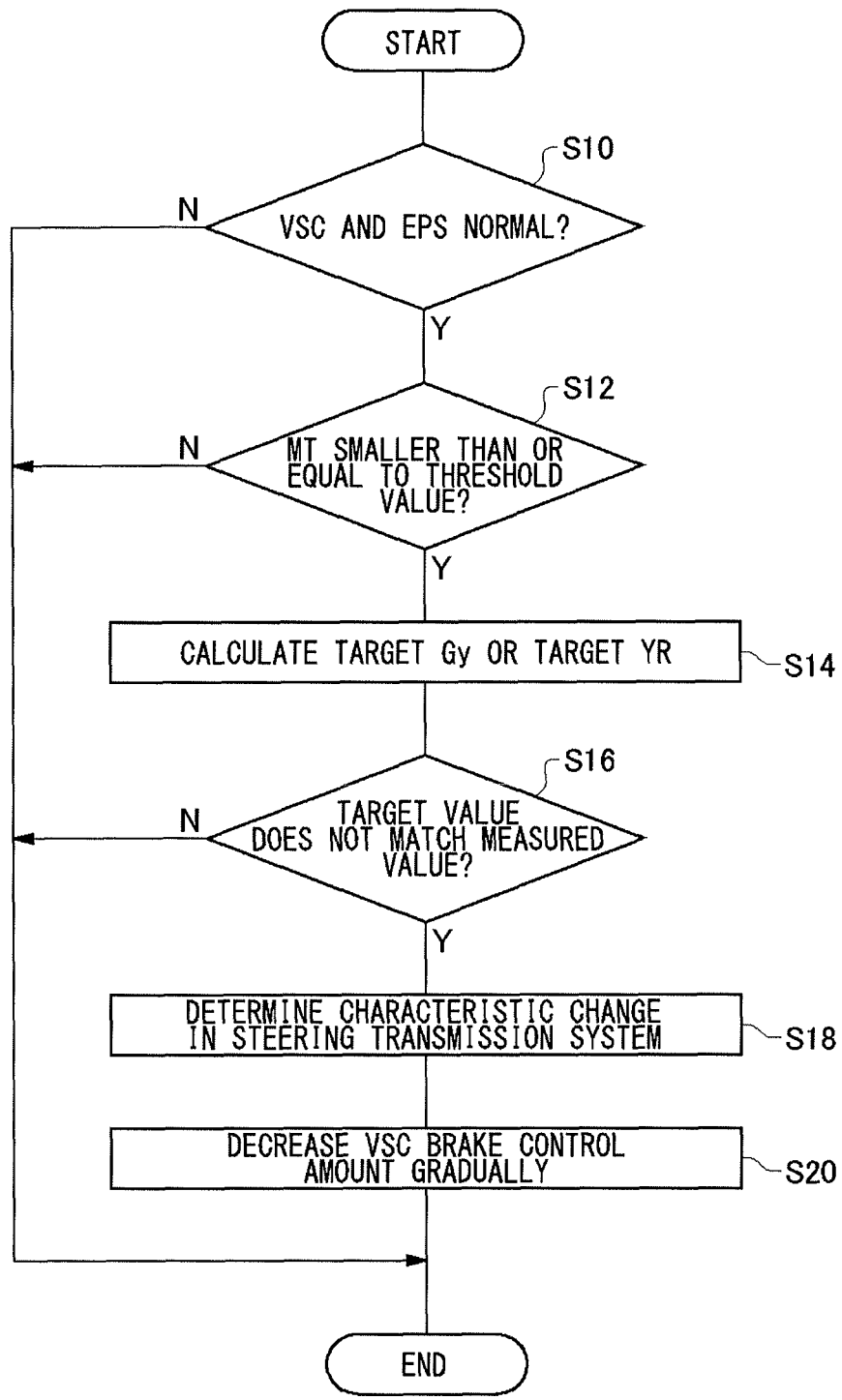
FIG. 4 is a flowchart showing abnormality determination for steering transmission system according to an embodiment.

FIG. 4 is a flowchart showing the abnormality determination for steering transmission system according to the present embodiment. It is first determined whether VSC and EPS are operating normally (S10). When both are operating normally (S10/Y), the steering torque determining unit 102 determines whether the detected value MT of the steering torque sensor 16 is smaller than or equal to a threshold value (S12). When the steering torque detected value MT is smaller than or equal to the threshold value (S12/Y), the target value calculator 104 calculates the target Gy or the target YR from the detected value MA of the steering angle sensor 18 (S14).

Figure 5:
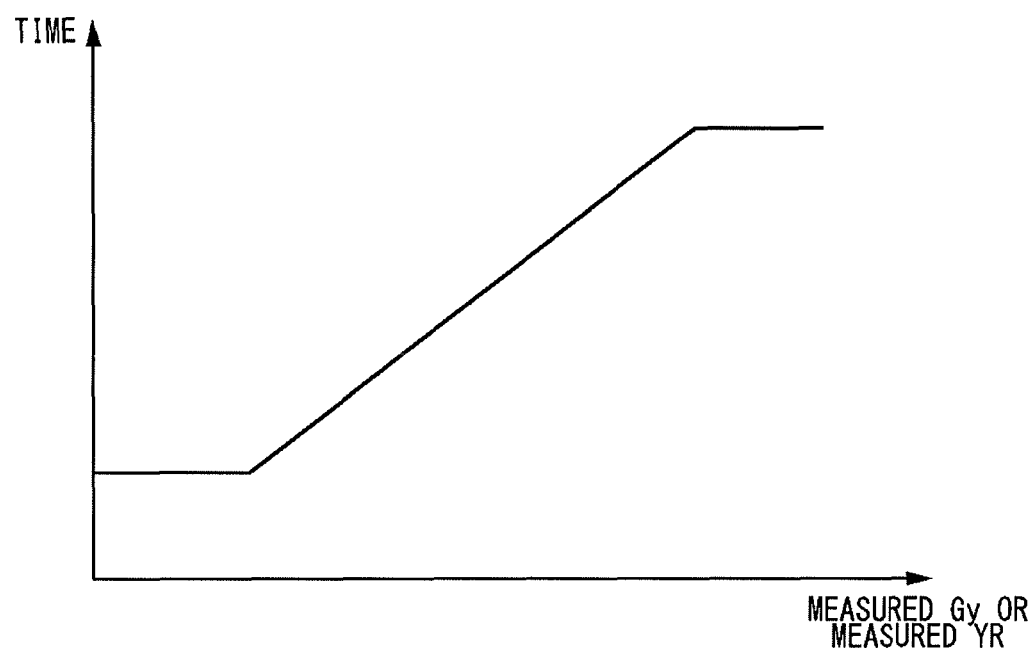
FIG. 5 is a graph showing the relationship between a measured vehicle state and a time during which a brake control amount is decreased.

Subsequently, the abnormality determining unit 106 determines, by using the method described with reference to FIG. 3, whether the target Gy or the target YR calculated in S14 does not match the measured Gy or the measured YR by the lateral acceleration sensor 42 or the yaw rate sensor 48 (S16). When both do not match each other (S16/Y), the abnormality determining unit 106 determines that a characteristic change is caused in the steering transmission system (S18). At this time, the brake control amount indicating unit 108 decreases the brake control amount in VSC over a time in accordance with the value of the measured Gy or the measured YR (S20). The relationship between the measured Gy or the measured YR and the time may be processed such that an upper limit and a lower limit of the time are set as illustrated, for example, in FIG. 5.

According to the present embodiment, a characteristic change (e.g., occurrence of a play) in a steering transmission system, which may be caused due to the aged deterioration of an elastic member such as a rubber bush, can be detected by using a detected value of the steering torque sensor or the steering angle sensor included in EPS, as described above.

The present invention has been described above based on embodiments. These embodiments are described for exemplary purposes only, and it can be readily understood by those skilled in the art that various modifications made by any combination of the embodiments or by any combination of the components or processes of the embodiments are also encompassed in the scope of the present invention.

The present invention should not be limited to the aforementioned embodiments, and various modifications, such as design modifications, can be made with respect to the above embodiments based on the knowledge of those skilled in the art. The structure illustrated in each view is intended to exemplify an example, and the structure can be appropriately modified to a structure that can provide similar functions.

In the present embodiment, it has been described that a characteristic change is caused in the steering transmission system, when the number of times when the absolute value of a difference between the target Gy (or target YR) and the measured Gy (or measured YR) is larger than or equal to a reference value is larger than or equal to a predetermined number of times during the one steering. However, this determination is not limited to that performed during the one steering. This determination may be performed, for example, when a vehicle is traveling straight or when the one steering is performed multiple times.

DESCRIPTION OF THE REFERENCE NUMERALS

10 VEHICLE
12 STEERING WHEEL
16 STEERING TORQUE SENSOR

18 STEERING ANGLE SENSOR
36 VEHICLE SPEED SENSOR
42 LATERAL ACCELERATION SENSOR
48 YAW RATE SENSOR
70 STEERING ECU
100 BRAKE ECU
102 STEERING TORQUE DETERMINING UNIT
104 TARGET VALUE CALCULATOR
106 ABNORMALITY DETERMINING UNIT
108 BRAKE CONTROL AMOUNT INDICATING UNIT

The invention claimed is:

1. A characteristic change detection device for steering transmission system, comprising:
 a steering torque sensor that detects steering torque of a steering wheel;
 a steering angle sensor that detects a steering angle of the steering wheel; and
 an abnormality determining unit that determines that a characteristic change is caused in a steering transmission system, when the steering torque is smaller than or equal to a predetermined value and when the number of times when a difference between target vehicle behavior that is calculated from the steering angle and actual vehicle behavior is larger than or equal to a reference value is larger than or equal to a predetermined number of times during a predetermined period of time, wherein the predetermined period of time is during driving operations ranging from a state in which a vehicle travels straight to a state in which, after a steering wheel is steered, the vehicle travels straight again.

2. The characteristic change detection device according to claim 1, further comprising:
 a lateral acceleration sensor or a yaw rate sensor as a sensor for measuring vehicle behavior.

* * * * *